(12) United States Patent
Nakamura et al.

(10) Patent No.: US 11,565,480 B2
(45) Date of Patent: Jan. 31, 2023

(54) METAL-RESIN COMPOSITE AND METHOD FOR PRODUCING SAME

(71) Applicant: DIC Corporation, Tokyo (JP)

(72) Inventors: Kenji Nakamura, Ichihara (JP); Tomomichi Kanda, Ichihara (JP); Hideaki Kikuchi, Minamisaku-gun (JP)

(73) Assignee: DIC Corporation, Tokyo (JP)

( * ) Notice: Subject to any disclaimer, the term of this patent is extended or adjusted under 35 U.S.C. 154(b) by 11 days.

(21) Appl. No.: 17/282,847

(22) PCT Filed: Oct. 10, 2019

(86) PCT No.: PCT/JP2019/040022
§ 371 (c)(1),
(2) Date: Apr. 5, 2021

(87) PCT Pub. No.: WO2020/075802
PCT Pub. Date: Apr. 16, 2020

(65) Prior Publication Data
US 2021/0347127 A1    Nov. 11, 2021

(30) Foreign Application Priority Data
Oct. 12, 2018   (JP) .............................. JP2018-193549

(51) Int. Cl.
*B32B 15/08* (2006.01)
*B29C 65/06* (2006.01)
*B29C 65/00* (2006.01)

(52) U.S. Cl.
CPC ........ *B29C 65/0681* (2013.01); *B29C 66/742* (2013.01); *B32B 15/08* (2013.01)

(58) Field of Classification Search
CPC .............................. B29C 66/742; B32B 15/08
See application file for complete search history.

(56) References Cited

U.S. PATENT DOCUMENTS

2007/0044406 A1   3/2007   Van Aken et al.
2010/0304083 A1   12/2010  Naritomi et al.

FOREIGN PATENT DOCUMENTS

| JP | 2010-158885 A | 7/2010 |
| JP | 2012-066287 A | 4/2012 |
| JP | 2014-180776 A | 9/2014 |
| JP | 2017-013084 A | 1/2017 |
| JP | 2017-177464 A | 10/2017 |
| KR | 10-1271839 B | 6/2013 |

*Primary Examiner* — Zachary M Davis
(74) *Attorney, Agent, or Firm* — Locke Lord LLP (57) ABSTRACT

There is provided a method for producing a metal-resin composite which includes a resin member and a metal member having a roughened surface in at least a portion of the surface thereof, the resin member being joined so as to be in contact with at least a portion of the roughened surface. The method includes a step of joining the resin member and the metal member by melting the resin member with the frictional heat generated in the surface of the metal member on its side opposite to the resin member in a state where the metal member and the resin member are superposed. The method includes making adjustment so that when the roughened surface is measured at arbitrary five points by using a confocal microscope according to ISO 25178, the developed area ratio (Sdr) is 5 or more in terms of number-average value.

12 Claims, 3 Drawing Sheets

METAL-RESIN COMPOSITE AND METHOD FOR PRODUCING SAME

CROSS REFERENCE TO RELATED APPLICATIONS

This application is related to co-pending application: "METAL-RESIN COMPOSITE AND METHOD FOR PRODUCING SAME" filed even date herewith in the names of Tomomichi Kanda and Kenji Nakamura as a national phase entry of PCT/JP2019/040025, which application is assigned to the assignee of the present application and is incorporated by reference herein.

TECHNICAL FIELD

The present invention relates to a method for producing a metal-resin composite including a metal member and a resin member which are joined together.

BACKGROUND ART

Metal-resin composites each including a metal member and a resin member which are joined together are used in a wide range of fields such as the automobile industry, the electronic device industry, etc. Examples of a general technique for joining together a metal member and a resin member include a technique using a fixing member such as a screw, a claw, or the like, and a technique using an adhesive, but these techniques have a problem of causing unsatisfactory joining strength or causing unsatisfactory hot-cold shock resistance. There is also a technique for joining a metal member and a resin member together by inserting in advance the metal member into a mold with a predetermined shape and then injecting a melt of the resin member into the mold. However, this technique has a problem that the metal member cannot be joined to the existing resin member or that joining strength is unsatisfactory.

In order to solve the problems, friction stir welding (simply referred to as "FSW" hereinafter) has been recently developed as a technique for joining together a metal member and a resin member. For example, Patent Literature 1 discloses a method for joining together a metal member and a resin member by using FSW, in which improvement in joining strength is achieved by specifying the outer diameter or push-in amount of a shoulder portion of a rotating tool for friction stirring used for pressing from the metal member side.

Patent Literature 2 discloses a method for joining together a metal body and a resin body by using FSW, in which improvement in joining strength is achieved by using a metal body having an oxide film formed on the surface thereof and breaking the oxide film.

Further, Patent Literature 3 discloses a method for joining together a metal body and a resin body by using FSW, in which improvement in joining strength is achieved by using a metal body having a hydroxide film formed on the surface thereof and exerting an interaction between the hydroxide film and the resin member.

CITATION LIST

Patent Literature

PTL 1: Japanese Patent No. 5531573
PTL 2: Japanese Patent No. 6096016
PTL 2: Japanese Unexamined Patent Application Publication No. 2017-13084

SUMMARY OF INVENTION

Technical Problem

As a result of earnest investigation on the joining methods described above, the inventors found that there is room for further improvement in terms of joining strength between a resin member and a metal member. The present invention has been achieved in consideration of the actual situation, and a problem of the invention is to provide a method for producing a metal-resin composite having excellent joining strength between a resin member and a metal member.

Solution to Problem

As a result of earnest research for solving the problems described above, the inventors found that a metal-resin composite having excellent joining strength between a resin member and a metal member can be produced by forming a roughened surface in at least a portion of the surface of the metal member and setting the lower limit of the developed area ratio (Sdr) of the roughened surface, leading to the present invention.

That is, the present invention relates to a method for producing a metal-resin composite including a metal member, having a roughened surface in at least a portion of the surface thereof, and a resin member, the resin member being joined so as to be in contact with at least a portion of the roughened surface. The method for producing a metal-resin composite includes a step of joining together the resin member and the metal member by melting the resin member with the frictional heat generated in the surface of the metal member on its side opposite to the resin member in a state where the metal member and the resin member are superposed. In the method, when the roughened surface is measured at arbitrary five points by using a confocal microscope according to ISO 25178, the developed area ratio (Sdr) is 5 or more in terms of number-average value.

The present invention relates to a method for producing a metal-resin composite including a metal member and a resin member which are joined together, and the metal member used has, in at least a portion of the surface thereof, a roughened surface having a developed area ratio (Sdr) of 5 or more in terms of number-average value measured according to ISO 25178. This method can produce a metal-resin composite having excellent joining strength between the metal member and the resin member. In the production method, the reason considered as the cause for making it possible to achieve improvement in joining strength between the metal member and the resin member is as follows.

The developed area ratio (Sdr) represents a surface area increased by surface roughening, and at least a portion of the surface of the metal member is roughened so that the Sdr value is 5 or more in terms of number-average value. The resin member is joined so as to be in contact with at least a portion of the resultant roughened surface. In the present invention, at this point, the resin member is melted by the frictional heat generated in the surface of the metal member on its side opposite to the resin member. Thus, the melted resin member is deeply penetrated into the roughened surface of the metal member having a surface area increased by surface roughening, thereby exhibiting a strong anchor effect. Consequently, the joining strength between the resin member and the metal member is improved.

In the method for producing a metal-resin composite, the frictional heat is preferably generated by pressing a rotating tool against on the surface of the metal member on its side opposite to the resin member. This configuration enables the resin member and the metal member to be more simply and securely joined together.

In the method for producing a metal-resin composite, the melt viscosity of the resin member is preferably 200 to 6000 Pa·s. In this configuration, the melted resin member is more deeply and securely penetrated into the roughened surface of the metal member having the surface area increased by surface roughening, thereby exhibiting a very strong anchor effect. Consequently, the joining strength between the resin member and the metal member is significantly improved. In the present invention, when the resin member is composed of only a thermoplastic resin, the term "melt viscosity of the resin member" represents its melt viscosity, and when the resin member contains another compounding agent, such as glass fibers, an olefinic resin, or the like, in addition to a thermoplastic resin, the term represents the melt viscosity of a resin composition containing these. The measurement conditions for the "melt viscosity" are described later.

In the method for producing a metal-resin composite, the resin member preferably contains a polyarylene sulfide resin. The polyarylene sulfide (also referred to as "PAS" hereinafter) resin is more deeply penetrated into the roughened surface during melting and is then solidified by cooling while crystallization proceeds, thereby exhibiting a stronger anchor effect. Consequently, the joining strength between the resin member and the metal member is more significantly improved.

The present invention also relates to a metal-resin composite including a metal member and a resin member which are joined together, the resin member containing at least a thermoplastic resin, and the metal member having a roughened surface in at least a portion of the surface thereof. When the roughened surface is measured at arbitrary five points by using a confocal microscope according to ISO 25178, the developed area ratio (Sdr) is 5 or more in terms of number-average value. In a state where the resin member is superposed so as to be in contact with at least a portion of the roughened surface, the resin member and the metal member are joined together by melting the resin member with the frictional heat generated in the surface of the metal member on its side opposite to the resin member. The melting point of the thermoplastic resin is 260° C. or more.

The present invention also relates to a metal-resin composite including a metal member and a resin member which are joined together, the resin member containing at least a thermoplastic resin, and the metal member having a roughened surface in at least a portion of the surface thereof. When the roughened surface is measured at arbitrary five points by using a confocal microscope according to ISO 25178, the developed area ratio (Sdr) is 5 or more in terms of number-average value. The resin member is joined so as to be in contact with at least a portion of the roughened surface, and the metal member has a press mark in the surface on its side opposite to the resin member. The melting point of the thermoplastic resin is 260° C. or more.

BRIEF DESCRIPTION OF DRAWINGS

FIGS. 4 (a)-(e) are drawings showing examples of a front view of a press mark formed on the surface of a metal member of a metal-resin composite produced by friction stir welding (FSW).

DESCRIPTION OF EMBODIMENTS

The present invention relates to a method for producing a metal-resin composite including a metal member and a resin member joined together. Each configuration is described below.

<Metal Member>

The present invention uses a metal member having a roughened surface in at least a portion of the surface thereof. The roughened surface can be formed by a surface roughening method described later, and is adjusted so that when the roughened surface is measured at arbitrary five points by using a confocal microscope according to ISO 25178, the developed area ratio (Sdr) is 5 or more in terms of number-average value.

[Metal Type]

A known metal member can be used regardless of the type thereof. That is, examples thereof include aluminum, copper, stainless, magnesium, iron, titanium, and an alloy containing these. More specific examples include iron, an alloy (hereinafter an "iron alloy") such as stainless, a steel material, or the like, which contains iron as a main component, i.e., at a ratio of 20% by mass or more, more preferably 50% by mass or more, and still more preferably 80% by mass or more, and which also contains carbon, silicon, manganese, chromium, tungsten, molybdenum, phosphole, titanium, vanadium, nickel, zirconium, boron, or the like; aluminum and an alloy (hereinafter an "aluminum alloy") which contains aluminum as a main component and which also contains copper, manganese, silicon, magnesium. Zinc, or nickel; magnesium and an alloy (hereinafter a "magnesium alloy") which contains magnesium as a main component and which also contains zinc, aluminum, or zirconium; copper and an alloy (hereinafter a "copper alloy") which contains copper as a main component and which also contains zinc, tin, phosphorus, nickel, magnesium, silicon, or chromium; and titanium and an alloy (hereinafter a "titanium alloy") which contains titanium as a main component and which also contains copper, manganese, silicon, magnesium, zinc, or nickel. Among these, iron, an iron alloy, an aluminum alloy, a magnesium alloy, a copper alloy, and a titanium alloy are more preferred, and an iron alloy, an aluminum alloy, and a magnesium alloy are still more preferred.

[Surface Roughening Method]

A known method for roughening the surface of the metal member can be used as long as the developed area ratio (Sdr) of the roughened surface can be adjusted within a predetermined range, and examples thereof include:

(1) an immersion method using an erosive aqueous solution or an erosive suspension;

(2) an anodization method; and (3) mechanical cutting by blasting or laser processing.

A roughening method for obtaining the roughened surface with a high developed area ratio (Sdr) is particularly preferably (1) the immersion method using an aqueous erosive solution or an erosive suspension or (2) the anodization method.

Before the fine concave-convex surface described above is formed, the metal member is preferably processed into a predetermined shape by cutting, plastic processing by pressing, punching, thinning such as cutting, grinding, discharge processing, or the like.

In addition, a primer layer may be formed on the surface of the metal member subjected to metal surface treatment. The material constituting the primer layer is not particularly limited but is usually composed of a primer resin material containing a resin component. The primer resin material is not particularly limited, and a known material can be used. Examples thereof include a known polyolefinic primer, an epoxy-based primer, a urethane-based primer, and the like. The method for forming the primer layer is not particularly limited, and the primer layer can be formed by, for example, coating a solution of the primer resin material or an emulsion of the primer resin material on the metal member subjected to the surface treatment. Examples of a solvent used for the solution include toluene, methyl ethyl ketone (MEK), dimethyl phosphoramide (DMF), and the like. Examples of a medium for the emulsion include an aliphatic hydrocarbon medium, water, and the like.

[Evaluation of Developed Area Ratio (Sdr) of Roughened Surface of Metal Surface]

The developed area ratio (Sdr) of the roughened surface represents an increase in the surface area due to surface roughening of metal and is one of surface roughness values specified by ISO 25178. The more the surface area of the metal member is increased by surface roughening, the stronger the anchor effect with a resin, which can be joined, becomes, and consequently the higher the joining strength of an integrated molded product including a metal and a resin becomes. Therefore, in the surface-roughened metal member used in the metal-resin structure of the present invention, when the roughened surface is measured at arbitrary five points by using a confocal microscope according to ISO 25178, the developed area ratio (Sdr) in terms of number-average value may be within a range of 5 or more but is more preferably within a range of 15 or more. On the other hand, the upper limit value is not particularly limited as described above, but is preferably within a range of 150 or less from the viewpoint that material failure can be suppressed by preventing stress concentration at an end point of the concave-convex portion of the metal surface.

The developed area ratio (Sdr) of the roughened surface represents surface roughness and thus can be evaluated with a confocal microscope. When the visible light wavelength is used, the height-direction resolution is in sub-μm order and the field range is in sub-mm order, making it possible to evaluate a three-dimensional structure most important in considering the anchor effect of the resin penetrated into the fine concave-convex surface of the surface-roughened metal.

The confocal microscope mentioned above includes a white confocal microscope and a monochromatic laser microscope.

The measurement of the developed area ratio (Sdr) of the roughened surface using the confocal microscope conforms to ISO 25178 as of 2018, but the points not mentioned above are further explained below. The first point is the field range of the microscope. The field range is preferably secured to have a length sufficiently longer than the concave-convex repeating length of the metal surface. An average length (RSm) of roughness curve elements determined by a stylus-type roughness meter described later is used as the repeating length. The field range of the microscope is preferably the file range obtained by using an objective lens of a microscope of 2 to 20 times the average length (RSm) of the roughness curve elements and is more preferably the field range obtained by using an objective lens of a microscope of 3 to 10 times the average length (RSm) of the roughness curve element.

The evaluation with the proper field range and height resolution as described above enables the confocal microscope to produce an appropriate height scanning three-dimensional image of the roughened surface of the metal member. However, in order to prevent changes in the developed area ratio (Sdr) of the roughened surface by analytical filtering of the three-dimensional image, surface filters (S filter and L filter) are applied to the original surface, and a cutoff length equivalent to JIS-B 0601-2001 is preferably applied as a surface filter. That is, low-pass cutoff $\lambda s$ is applied to the S filter, and high-pass cutoff length $\lambda c$ is applied to the L filter, and median filtering with a filter size of 3×3 is carried out in the entire region of the resultant S-L surface considered as an evaluation region. Then, the developed area ratio (Sdr) of the roughened surface of the metal member relative to the resultant measured surface is preferably calculated.

Taking into consideration that because the field range which can be measured by one time of microscope observation is about 100 to 500 μm, evaluation of the developed area ratio (Sdr) of the entire roughened surface of the metal member is practically difficult, in the present invention, evaluation is preferably made at arbitrary five points of the metal member surface, and evaluation is more preferably made at the five points including the center and four corners of the joining surface (3) between a metal member (1) and a resin member (2). In the present invention, the number-average value at the five points is defined as the developed area ratio (Sdr) of the roughened surface. The developed area ratio (Sdr) calculated for the roughened surface by the method described above has high reproducibility and is thus preferred as an index indicating the roughening degree of the metal member when a roughening method is changed.

In addition, from the viewpoint of preventing measurement error caused by a difference in resolution and filtering due to a difference of an evaluation apparatus, it is also preferred to use the ratio (Sdr1/Sdr0) of the number-average value (Sdr1) of the developed area ratio (Sdr) of the roughened surface at arbitrary five points of the surface-roughened metal member surface to the number-average value (Sdr0) of the interfacial developed area ratio (Sdr) at arbitrary five points of the metal member surface before surface roughening in the step of surface-roughening the metal member. The ratio (Sdr1/Sdr0) is preferably within a range of 7 or more and more preferably within a range of 20 or more. For the same reason as described above, the upper limit value is not particularly limited, but the ratio (Sdr1/Sdr0) is preferably within a range of 130 or less and more preferably within a range of 100 or less from the viewpoint that material failure can be suppressed by preventing stress concentration at an end of the concave-convex portion of the metal surface.

In measurement for calculating the ratio (Sdr1/Sdr0), treatment with a surface filter or a median filter is not necessarily required, but filter treatment is more preferably performed.

[Evaluation of Maximum Height Roughness (Rz) and Element Average Length (RSm) of Roughness Curve by Stylus-Type Roughness Meter]

In the present invention, in calculating the developed area ratio (Sdr) of the roughened surface of the metal member, the element average length (RSm) of the roughness curve obtained by using a stylus-type roughness meter can be determined. This can be used for determining the field range of the confocal microscope used for calculating the developed area ratio (Sdr) of the roughened surface. Also, the maximum height roughness (Rz) of the roughness curve can be more preferably determined by the stylus-type roughness meter.

That is, the average length (RSm) of the roughness curve elements obtained by using the stylus-type roughness meter is measured in arbitrary four straight-line portions of the surface of the surface-roughened metal member using the stylus-type roughness meter according to JIS B0601-2001 (ISO 4287).

From the viewpoint of improving the joining strength between the resin member and the metal member, preferably, Rz of the roughened surface is 2 to 10 μm, and RSm is 10 to 100 μm, or Rz is 10 μm or more, and RSm is 100 to 500 μm. Within this range, the anchor effect promoting adhesion to the roughened surface can be obtained, and embrittlement of the metal member due to excessive roughening does not occur, thereby easily achieving joining strength.

A commercial apparatus can be used as the stylus-type roughness meter according to a common method. However, in evaluating the surface roughness of the metal member, measurement is preferably performed under the conditions below according to JIS-B 0601-2001 (ISO 4287). That is, a spherical indenter is used, and a tip radius of 2 to 10 μm is preferably used, and a tip radius of 2 to 5 m is more preferably used. The evaluation length and reference length, the scanning speed, and the cutoff length are selected as appropriate values in view of the arithmetic average roughness (Ra) of the roughness curve of the metal member. For example, when the arithmetic average roughness (Ra) of the metal member is 0.1 to 2 μm, an evaluation length of 4 mm, a reference length of 0.8 mm, a scanning speed of 0.06 mm/s, and a low-pass cutoff length of 2.5 μm (Gaussian filter) are used. The measurement positions of the stylus-type roughness meter include arbitrary two straight-line portions in a parallel relation with each other in the roughened surface of the metal member and arbitrary two straight-line portions in a vertical relation thereto, and thus an average of the values of the parameters in a total four straight lines is used.

<Resin Member>

For example, a molded product produced by melt-molding a thermoplastic resin can be used as the resin member. Usable examples of the thermoplastic resin include a polyethylene resin, a polypropylene resin, a polystyrene resin, a rubber-modified polystyrene resin, an acrylonitrile-butadiene-styrene (ABS) resin, an acrylonitrile-styrene (AS) resin, a polymethyl methacrylate resin, an acrylic resin, a polyvinyl chloride resin, a polyvinylidene chloride resin, a polyethylene terephthalate resin, an ethylene vinyl alcohol resin, a cellulose acetate resin, an ionomer resin, a polyacrylonitrile resin, a polyamide resin, a polyacetal resin, a polybutylene terephthalate resin, a polylactic acid resin, a polyphenylene ether resin, a modified polyphenylene ether resin, a polycarbonate resin, a polysulfone resin, a polyarylene sulfide resin, a polyether imide resin, a polyether sulfone resin, a polyarylate resin, a thermoplastic polyimide resin, a polyamide-imide resin, a polyether ether ketone resin, a polyketone resin, a liquid crystal polyester resin, a fluorocarbon resin, a syndiotactic polystyrene resin, a cyclic polyolefinic resin, and the like. These thermoplastic resins can be used alone or in combination of two or more. Among these, a polyarylene sulfide (PAS) resin and a polycarbonate resin are preferred. Further, from the viewpoint of melt viscosity and crystallization behavior, the resin member preferably contains a PAS resin because of excellent joining strength to the metal member used in the present invention, and the PAS resin is particularly preferably a polyphenylene sulfide (also referred to as "PPS" hereinafter) resin.

From the viewpoint of improvement in joining strength to the metal member, the content of the PAS resin is preferably 30% by mass or more and more preferably 50% by mass or more, assuming that the total amount of the thermoplastic resin in the resin member is 100% by mass.

[Polyarylene Sulfide (PAS) Resin]

The PAS resin has a resin structure having, as a repeating unit, a structure in which an aromatic ring and a sulfur atom are bonded to each other, and is specifically a resin having a repeating unit having a structural part represented by the following general formula (1):

[Chem. 1]

Formula (1)

(in the formula, $R^1$ and $R^2$ each independently represent a hydrogen atom, an alkyl group having carbon atoms within a range of 1 to 4, a nitro group, an amino group, a phenyl group, a methoxy group, or an ethoxy group) and, if required, a trifunctional structural part represented by the following general formula (2):

[Chem. 2]

Formula (2)

The amount of the trifunctional structural part represented by the general formula (2) is preferably within a range of 0.001 to 3 mol % and particularly preferably within a range of 0.01 to 1 mol % relative to the total number of moles with other structural parts.

Herein, in the structural part represented by the general formula (1), $R^1$ and $R^2$ in the formula are each independently particularly preferably a hydrogen atom from the viewpoint of mechanical strength of the PAS resin. In this case, for example, bonds are formed at the para-position represented by the following formula (3) and at the meta-position represented by the following formula (4).

[Chem. 3]

Formula (3)

Formula (4)

Among these, in view of heat resistance and crystallinity of the PAS resin, the PAS resin particularly preferably has a structure in which the sulfur atom bond to an aromatic ring in the repeating unit is particularly preferably formed at the para-position represented by the general formula (3).

In addition, the PAS resin may contain not only the structural parts represented by the general formulae (1) and (2) but also structural parts represented by the following structural formulae (5) to (8) at a content of 30 mol % or less of the total with the structural parts represented by the general formula (1) and the general formula (2).

[Chem. 4]

Formula (5)
Formula (6)
Formula (7)
Formula (8)

In the present invention, from the viewpoint of heat resistance and mechanical strength of the PAS resin, the amount of the structural parts represented by the general formulae (5) to (8) is particularly preferably 10 mol % or less. When the PAS resin contains the structural parts represented by the general formulae (5) to (8), the bonding forms thereof may be either a random copolymer or a block copolymer.

Also, the PAS resin may have a naphthyl sulfide bond in its molecular structure, and the amount thereof is preferably 3 mol % or less and particularly preferably 1 mol % relative to the total number of moles with other structural parts.

(Production Method)

Examples of a method for producing the PAS resin include, but are not particularly limited to: 1) a method of polymerizing a dihalogeno-aromatic compound with a polyhalogeno-aromatic compound or another copolymerization component added if required in the presence of sulfur and sodium carbonate; 2) a method of polymerizing a dihalogeno-aromatic compound with a polyhalogeno-aromatic compound or another copolymerization component added if required in the presence of a sulfiding agent in a polar solvent; 3) a method of self-condensing p-chlorothiophenol with another copolymerization compound added if required; 4) a method of melt-polymerizing a diiodo aromatic compound and elemental sulfur under reduced pressure in the presence of a polymerization inhibitor which may have a functional group such as a carboxyl group, an amino group, or the like; and the like. Among these methods, the method 2) is generally used and preferred. During reaction, an alkali metal salt of carboxylic acid or sulfonic acid or alkali hydroxide may be added for adjusting the degree of polymerization. The method 2) is particularly preferably a method for producing the PAS resin in which a hydrous sulfiding agent is introduced into a mixture containing the heated organic polar solvent and dihalogeno-aromatic compound at a rate which permits removal of water from the reaction mixture, and the dihalogeno-aromatic compound and the sulfiding agent are reacted with a polyhalogeno-aromatic compound added if required in the organic polar solvent, and in which the water amount in the reaction system is controlled within a range of 0.02 to 0.5 moles per mole of the organic polar solvent (refer to Japanese Unexamined Patent Application Publication No. 07-228699); or a method in which a dihalogeno-aromatic compound and, if required, a polyhalogeno-aromatic compound or another copolymerization component are added in the presence of a solid alkali metal sulfide and an aprotic polar organic solvent, and the alkali metal hydrosulfide is reacted with an organic acid alkali metal salt while the organic acid alkali metal salt is controlled within a range of 0.01 to 0.9 moles per mole of sulfur source, and the water amount in the reaction system is controlled within a range of 0.02 moles per mole of the aprotic polar organic solvent (refer to Pamphlet No. WO2010/058713). Examples of the dihalogeno-aromatic compound include p-dihalobenzene, m-dihalobenzene, o-dihalobenzene, 2,5-dihalotoluene, 1,4-dihalonaphthalene, 1-methoxy-2,5-dihalobenzene, 4,4'-dihalobiphenyl, 3,5-dihalobenzoic acid, 2,4-dihalobenzoic acid, 2,5-dihalonitrobenzene, 2,4-dihalonitrobenzene, 2,4-dihaloanisole, p,p'-dihalodiphenyl ether, 4,4'-dihalobenzophenone, 4,4'-dihalodiphenyl sulfone, 4,4'-dihalodiphenyl sulfoxide, 4,4'-dihalodiphenyl sulfide, and a compound having an alkyl group having carbon atoms within a range of 1 to 18 in the aromatic ring of each of the compounds described above. Examples of the polyhalogeno-aromatic compound include 1,2,3-trihalobenzene, 1,2,4-trihalobenzene, 1,3,5-trihalobenzene, 1,2,3,5-tetrahalobenzene, 1,2,4,5-tetrahalobenzene, 1,4,6-trihalonaphthalene, and the like. The halogen atom contained in each of the compounds is preferably a chlorine atom or a bromine atom.

Examples of a post-treatment method for the reaction mixture containing the PAS resin produced in the polymerization step include, but are not particularly limited to: (1) a method in which after polymerization reaction, first the solvent is distilled off from the reaction mixture as it is or after adding an acid or base to it under reduced pressure or normal pressure, and next the solid after distilling off the solvent is washed with the reaction solvent (or an organic solvent having the equivalent solubility for a low-molecular polymer), acetone, methyl ethyl ketone, an alcohol, or the like one or two or more times, and further neutralized, washed with water, filtered, and dried; (2) a method in which after polymerization reaction, a solvent (solvent soluble in the polymerization solvent used and poor for at least PAS), such as water, acetone, methyl ethyl ketone, an alcohol, an ether, a halogenated hydrocarbon, an aromatic hydrocarbon, an aliphatic hydrocarbon, or the like, is added as a sedimentation agent to the reaction mixture to sediment solid products such as PAS and an inorganic salt, which are then filtered, washed with water, and dried; (3) a method in which after polymerization reaction, the reaction solvent (or an organic solvent having equivalent solubility for a low-molecular polymer) is added to the reaction mixture and stirred, and then a low-molecular-weight polymer is removed by filtration and then washed with a solvent, such as water, acetone, methyl ethyl ketone, an alcohol, or the like one or two or more times, then neutralized, water-washed, filtered, and then dried; (4) a method in which after polymerization reaction, the reaction mixture is water-washed by adding water and filtered, and if required, acid-treated by adding an acid during water washing, and then dried; (5) a method in which after polymerization reaction, the reaction mixture is filtered and, if required, washed with the reaction solvent one or two or more times, further water-washed, filtered, and then dried; and the like.

In the post-treatment methods (1) to (5) exemplified above, the PAS resin may be dried in vacuum or in air or an inert gas atmosphere such as nitrogen.

(Melt Viscosity)

When the melted resin member can be deeply securely penetrated into the roughened surface of the metal member having the surface area increased by surface roughening, the joining strength between the resin member and the metal member is improved by the anchor effect. Therefore, the melt viscosity of the resin member is within a range of preferably 200 Pa·s or more and more preferably 1000 Pa·s or more to preferably 6000 Pa·s or less and more preferably 5000 Pa·s or less. In the present invention, the melt viscosity represents a value measured under the condition of the same resin temperature as during joining and the condition of a shear rate of 10/s. In the present invention, as an example of the measurement method, measurement is performed by using a capillary rheometer according to JIS K7199 or ISO 11443. The measurement shows a value measured at a shear rate of 10/s under the condition of a resin temperature separately measured during joining and the condition of ratio L/D=40 between orifice length (L) to the orifice diameter (D). When the melt viscosity of the resin member measured under the conditions described above is set within the range described above, the joining strength between the resin member and the metal member can be more enhanced.

(Melting Point (Tm) and Recrystallization Temperature (Tc2))

As described above, the melted resin member is penetrated into the roughened surface of the metal member having the surface area increased by surface roughening, thereby exhibiting the anchor effect and thus improving the joining strength between the resin member and the metal member. When the resin member is deeply penetrated into the roughened surface of the metal member during melting and then solidified by cooling while crystallization proceeds, the stronger anchor effect is exhibited, and thus the joining strength between the resin member and the metal member is further improved. Thus, from the viewpoint of improving the joining strength between the resin member and the metal member by optimizing the crystallization behavior of the resin member, the melting point (Tm) of the resin member is preferably within a range of 270° C. or more and more preferably within a range of 270° C. to 300° C. Also, the recrystallization temperature (Tc2) of the resin member, particularly, the PAS resin, is preferably within a range of 180° C. to 260° C. The melting point (Tm) and recrystallization temperature (Tc2) can be measured by using a differential scanning calorimeter (DSC). For example, the melting point (Tm) is measured by heating to a temperature of 10° C. or more higher than the resin melting point at a heating rate of 20° C./min, and then the recrystallization temperature (Tc2) can be measured by temperature lowering at a rate of 20° C./min.

(Non-Newtonian Index)

In view of improvement in joining strength between the resin member and the metal member, the non-Newtonian index of the resin member, particularly the PAS resin, used in the present invention is preferably within a range of 0.90 to 2.00. When a linear PAS resin is used, the non-Newtonian index is preferably within a range of 0.90 to 1.50 and more preferably within a range of 0.95 to 1.25. Such a PAS resin has excellent mechanical and physical properties, fluidity, and abrasion resistance. However, the non-Newtonian index (N value) is a value calculated by using a formula below from the shear rate and shear stress measured by using Capilograph under at 300° C. the condition of ratio (L/D) =40 of the orifice length (L) to orifice diameter (D), $$SR = K \cdot SS^N \qquad \text{[Math. 1]}$$

[wherein, SR represents the shear rate (1/second), SS represents the shear stress (dyne/cm2), and K represents a constant]. This shows that the closer to 1 the N value is, the closer to linear the structure of the PPS resin is, and the higher the N value is, the more branched the structure is.

[Olefinic Polymer]

When the PAS resin is used as the resin member, an olefinic polymer may be mixed together with the PAS resin from the viewpoint of improving toughness and hot-cold shock properties of the PAS resin. Examples of the olefinic polymer include a polymer produced by polymerizing one or two or more α-olefins such as ethylene, propylene, 1-butene, 1-petene, 4-methyl-1-pentene, isobutylene, and the like, and a copolymer of the α-olefin with α,β-unsaturated acid or its alkyl ester, such as (meth)acrylic acid, methyl (meth)acrylate, ethyl (meth)acrylate, butyl (meth)acrylate, or the like. In the present invention, the term "(meth)acrylic" represents "acrylic" and/or "methacrylic".

From the viewpoint of improving compatibility with the PAS resin and other components, the olefinic polymer preferably has a functional group therein. This can improve the hot-cold shock properties of the resin member. Examples of the functional group include an epoxy group, a carboxyl group, an isocyanate group, an oxazoline group, and a group represented by the formula: R(CO)O(CO)— or R(CO)O— (in the formula, R represents an alkyl group having carbon atoms within a range of 1 to 8). The olefinic polymer having such a functional group can be produced by, for example, copolymerizing the α-olefin with a vinyl polymerizable compound having the functional group. Examples of the vinyl polymerizable compound having the functional group include, in addition to the α,β-unsaturated acid and its alkyl ester, maleic acid, fumaric acid, itaconic acid, and other α,β-unsaturated dicarboxylic acids having carbon atoms within a range of 4 to 10 and derivatives thereof (mono or diesters and anhydrides thereof), and glycidyl (meth)acrylate, and the like. Among these olefinic polymers, from the viewpoint of improving toughness and shock resistance, the olefinic polymer is preferably an olefinic polymer having at least one functional group selected from the group consisting of an epoxy group, a carboxyl group, and a group represented by the formula: R(CO)O(CO)— or R(CO)O— (in the formula, R represents an alkyl group having carbon atoms within a range of 1 to 8), and an olefinic resin particularly preferably contains a copolymer of alkane, alkyl acrylate, and glycidyl acrylate.

In combination with the PAS resin, the content of the olefinic polymer is within a range of preferably 0.01 parts by mass or more and more preferably 0.1 parts by mass or more to preferably 30 parts by mass or less and more preferably 15 parts by mass or less, assuming that the total amount of the PAD resin is 100 parts by mass. When the content of the olefinic polymer is set within the range described above, molding fluidity and heat cycle resistance, shock resistance, and toughness of the resin member can be improved in good balance.

[Filler]

In order to improve the joining strength with the metal member and heat cycle resistance, a filler in addition to the thermoplastic resin may be mixed in the resin member used in the present invention. A well-known common material can be used as the filler as long as it does not impair the effect of the present invention, and usable examples thereof include fillers having various shapes such as a fibrous shape, a non-fibrous shape such as a particle shape or a plate-like shape, and the like. Usable examples thereof include fibrous fillers such as glass fibers, carbon fibers, silane glass fibers, ceramic fibers, aramid fibers, metal fibers, fibers of potassium titanate, silicon carbide, calcium silicate, wollastonite and the like, natural fibers, and the like. Other usable examples include non-fibrous fillers such as glass beads, glass flakes, barium sulfate, clay, pyrophyllite, bentonite, sericite, mica, mica, talk, attapulgite, ferrite, calcium silicate, calcium carbonate, magnesium carbonate, glass beads, zeolite, milled fibers, calcium sulfate, and the like.

When the filler is mixed, the mixing ratio thereof is not particularly limited as long as the effect of the invention is not impaired, and the ratio cannot be specified unconditionally because it depends on the purpose. The ratio is within a range of preferably 1 part by mass or more and more preferably 10 parts by mass or more to preferably 200 parts by mass or less and more preferably 100 parts by mass or less relative to 100 parts by mass of the polyarylene sulfide resin. This range is preferred because a resin composition exhibits good mechanical strength and moldability.

[Other Component]

In particular, when the PAS resin is used, if required, a phenol resin may be mixed as an arbitrary component in the resin member used in the present invention. The phenol resin represents a thermoplastic polymer having a phenol skeleton, and either a novolac-type phenol resin or a bisphenol-type phenol resin can be preferably used. Further, the novolac-type phenol resin is more preferred.

The phenol resin preferably a higher hydroxyl group equivalent, and the range thereof may be a known range. Because bonding force or adhesive force can be more improved, the hydroxyl group equivalent is within a range of preferably 80 g/equivalent or more, more preferably 100 g/equivalent or more, and still more preferably 110 g/equivalent to preferably 200 g/equivalent or less, more preferably 180 g/equivalent or less, and still more preferably 150 g/equivalent or less.

In addition, when the phenol resin is mixed, the mixing ratio thereof is not particularly limited as long as the effect of the invention is not impaired, and the ratio cannot be specified unconditionally because it depends on the purpose. The ratio is within a range of preferably 0.1 part by mass or more and more preferably 1 part by mass or more to preferably 10 parts by mass or less and more preferably 3 parts by mass or less relative to 100 parts by mass of PAS resin. Setting within this range is preferred because, for example, when the resin member and the metal member are joined/integrated and used, the joining strength is improved. In addition, mixing the phenol resin can decrease the viscosity of the resin composition containing the PAS resin and can improve fluidity during molding.

In addition, when the PAS resin is used as a raw material of the resin member used in the present invention, another synthetic resin can be properly further mixed as an arbitrary component according to applications. Examples thereof include an epoxy resin, a polyester resin, a polyamide resin, a polyimide resin, a polyetherimide resin, a polycarbonate resin, a polyphenylene ether resin, a polysulfone resin, a polyether sulfone resin, a polyether ether ketone resin, a polyether ketone resin, a polyarylene resin, a polyethylene resin, a polypropylene resin, a polytetrafluoroethylene resin, a polydifluoroethylene resin, a polystyrene resin, an ABS resin, a phenol resin, a urethane resin, a liquid crystal polymer, and the like (simply referred to as a "synthetic resin" hereinafter). In the present invention, the synthetic resin is not an essential component, but when mixed, the mixing ratio is not particularly limited as long as the effect of the present invention is not impaired, and the ratio cannot be unconditionally specified because it depends on the purpose thereof. However, the ratio of the synthetic resin mixed in the resin composition used as a raw material in the present invention is, for example, about within a range of preferably 0.01 parts by mass or more to preferably 20 parts by mass or less relative to 100 parts by mass of the PAS resin. In other words, the mixing ratio, on a mass basis, of the PAS resin relative to the total amount of the PAS resin and the synthetic resin is within a range of preferably (100/100.01) or more to preferably (100/120) or less.

Further, when the PAS resin is used as the raw material of the resin member used in the present invention, if required, well-known common additives may be also mixed as arbitrary components. Examples of the additives include a coloring agent, an antistatic agent, an antioxidant agent, a thermal stabilizer, an ultraviolet stabilizer, an ultraviolet absorber, a foaming agent, a flame retardant, a flame retardant auxiliary, an anti-rust agent, a coupling agent, and the like. These additives are not essential components, but when mixed, the mixing ratio thereof is not particularly limited as long as the effect of the present invention is not impaired, and the ratio cannot be unconditionally specified because it depends on the purpose thereof. However, the additives may be properly adjusted and used within a range of preferably 0.01 parts by mass or more to preferably 1,000 parts by mass or less relative to 100 parts by mass of the PAS resin according to purpose so that the effect of the present invention is not impaired.

[Method for Producing Resin Member]

The resin member according to the present invention can be produced by molding, into an arbitrary shape, a resin composition prepared by melt-kneading the thermoplastic resin and further, if required, the materials exemplified above. When the PAS resin is used as the thermoplastic resin, for example, the PAS resin and glass fibers as essential components and, if required, other arbitrary components are mixed and melt-kneaded at a temperature equal to or higher than the melting point of the PAS resin. In embodiments below, description is made on the basis of a case using the PAS resin as the thermoplastic resin.

A preferred method for preparing the resin composition includes adding and dry-blending the essential components and the arbitrary components in any one of various forms, such as a powder, pellets, or strips, in a ribbon blender, a Henschel mixer, a V-blender, or the like, and then adding to a well-known melt-kneader, such as a Banbury mixer, a mixing roll, a single-screw or twin-screw extruder, or a kneader. Then, the resin composition can be prepared through the step of melt-kneading within a temperature range in which the resin temperature is equal to or higher than the melting point of the PAS resin, preferably within a temperature range of melting point+10° C. or more, more preferably within a temperature range of melting point+10° C. to melting point+100° C., and still more preferably within a temperature range of melting point+20° C. to melting point+50° C. The components may be added and mixed in the melt-kneader at once or in a divided manner.

From the viewpoint of dispersibility and productivity, the melt-kneader is preferably a twin-screw kneading extruder, and, for example, melt-kneading is preferably performed while properly adjusting the discharge amount of the resin component within a range of 5 to 500 (kg/hr) and the crew rotational speed within a range of 50 to 500 (rpm), and melt-kneading is more preferably performed under the condition in which the ratio (discharge amount/screw rotational speed) is within a range of 0.02 to 5 (kg/hr/rpm). When among these components, the filler and the additives are added, from the viewpoint of dispersibility, these are preferably added to the twin-kneading extruder from a side feeder of the extruder. The position of the side feeder is preferably at a position where the ratio of the distance from the extruder resin inlet to the side feeder to the screw total length of the twin-screw kneading extruder is preferably within a range of 0.1 to 0.9. The ratio is particularly preferably within a range of 0.3 to 0.7.

The resin composition prepared by melt-kneading as described above is a melt mixture containing the essential components and the arbitrary components added if required and components derived therefrom, and after melt-kneading, the mixture is preferably processed into a form such as pellets, chips, grains, or a powder by a well-known method and, if required, pre-dried at a temperature of 100° C. to 150° C., and then subjected to various molding.

The PAS resin composition prepared by the production method described above forms morphology containing glass fibers dispersed in the PAS resin as a matrix. This greatly improves the mechanical strength of the resin member.

The resin member used in the present invention can be produced by, for example, melt-molding the PAS resin composition. The melt-molding may be performed by a known method, and applicable examples thereof include various molding methods such as injection molding, compression molding, extraction molding for a composite, a sheet, a pipe, and the like, pultrusion molding, blow molding, transfer molding, and the like. Injection molding is particularly suitable. In the case of injection molding, various molding conditions are not particularly limited, and molding can be usually performed by a general method. For example, the PAS resin composition may be injected into a mold from a resin outlet and molded after passing through the step of melting in an injection molding machine within a temperature range in which the resin temperature is equal to or higher than the melting point of the PAS resin, preferably within a temperature range of the melting point+10° C. or more, more preferably within a temperature range of the melting point+10° C. to the melting point+100° C., and still more preferably within a temperature range of the melting point+20° C. to the melting point+50° C. In this case, the mold temperature is also set within a known temperature range, preferably within a range of room temperature (23° C.) to 300° C., more preferably within a range of 40° C. to 200° C., and most preferably within a range of 120° C. to 180° C.

<Step of Joining Together Resin Member and Metal Member>

The method for producing the metal-resin composite according to the present invention includes the step of melting the resin member with the frictional heat generated in the surface of the metal member on its side opposite to the resin member in a state where the metal member and the resin member are superposed, and then joining together the resin member and the metal member. In particular, the present invention preferably includes the step of generating frictional heat by pressing a rotated rotating tool on the surface of the metal member on its side opposite to the resin member in the state where the metal member and the resin member are superposed, melting the resin member by heat transfer of the frictional heat through the metal member, and then joining together the resin member and the metal member. In particular, the latter is referred to as a "friction stir welding (FSE)". An example of the joining step according to an embodiment of the present invention is described below using FSW as an example. The joining step using FSW includes (1) a step of superposing the metal member and the resin member, and (2) a step of friction stirring.

(1) Step of Superposing the Metal Member and the Resin Member

Figure 1:
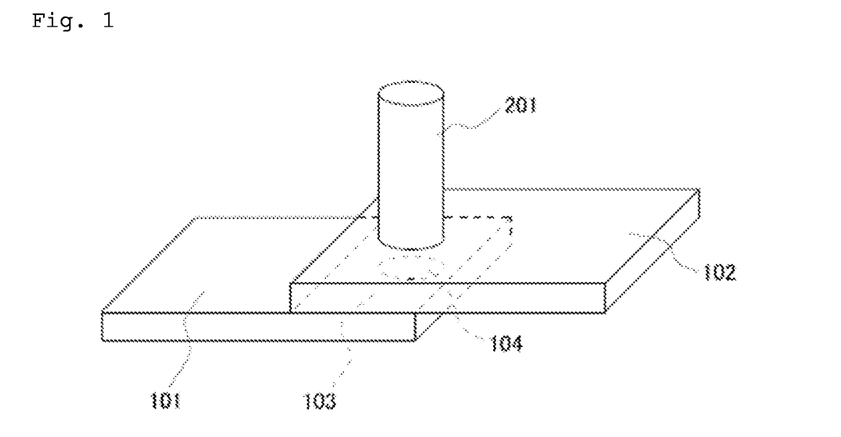
FIG. 1 is a drawing showing an example of a method for joining together a metal member and a resin member according to an embodiment of the present invention.
Figure 2:
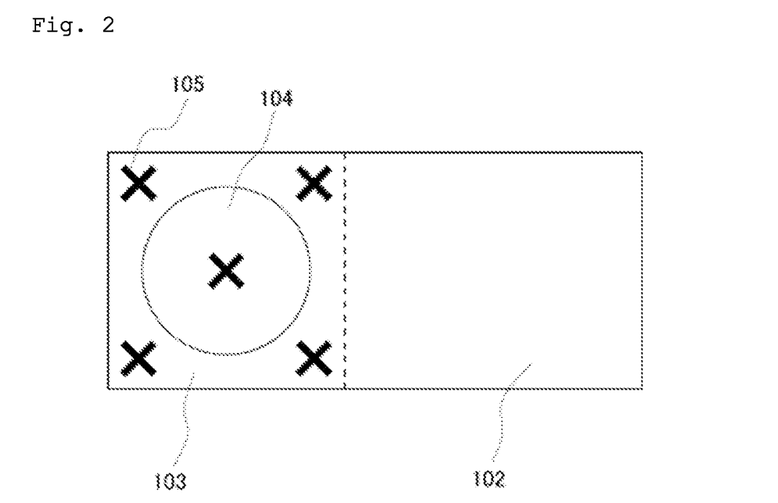
FIG. 2 is a drawing showing an example of a roughened surface 103 of a metal member 102 shown in FIG. 1.

First, the metal member having a roughened surface in at least a portion of the surface thereof and the resin member are prepared, and the resin member is superposed so as to be in contact with at least a portion of the roughened surface of the metal member. In an example shown in FIG. 1, a roughened surface 103 is formed in one (the lower-side surface in FIG. 1) of the surfaces of a metal member 102, and a resin member 101 is superposed so as to be in contact with the roughened surface 103. The metal member 102 and the resin member 101 superposed on each other are fixed by a fixing unit not shown. FIG. 2 shows the roughened surface 103 of the metal member 102, and in the present invention, the number-average value at a total of five points (105 in the drawing), the center and four corners of the roughened surface, is defined as the developed area ratio (Sdr) of the roughened surface.

(2) Friction Stirring Step

In the friction stirring step, a rotating tool 201 is pressed on the surface of the metal member 102 on its side opposite to the resin member 101. The material and shape of the rotating tool 201 can be variously changed according to the metal type and shape of the metal member 102, and a metal harder than the metal constituting the metal member 102 is preferably used as the material. In addition, FIG. 1 shows, an example in which the rotating tool 201 has a cylindrical shape and a flat lower surface (surface to be brought into contact with the metal member 102), but the lower surface may have a R-like shape, a taper shape, or a taper R-like shape. In addition, for example a pin, for positing may be formed at the center of the lower surface of the rotating tool 201, or a plurality of pins or any desired shape, such as a spiral or helical shape, may be formed on the lower surface of the rotating tool 201 in order to efficiently generate the frictional heat. The rotating tool 201 may be vertical to the metal member 102 as shown in FIG. 1 or the rotating tool 201 may be inclined during pressing. In addition, during pressing, the push-in speed and push-in pressure of the rotating tool 201 and the rotational speed of the rotating tool 201 can be arbitrarily designed.

In the friction stirring step, the frictional heat is generated in the surface of the metal member by rotating the rotating tool while pressing the rotating tool on the surface of the metal member on its side opposite to the resin member, and the frictional heat is transferred through the metal member to melt the resin member in contact with the metal member on the opposite side. When the metal member has the roughened surface, formed by surface roughing, in at least a portion of the portion in contact with the resin member, the metal member and the resin member are adhered to each other while the melted resin is deeply penetrated into the roughened surface. Then, the rotating tool is separated from the surface of the metal member, the rotational speed is decreased under pressing of the rotating tool, or supply of the frictional heat is suppressed or stopped by stopping the rotation. Thus, the resin member adhered and penetrated into the roughened surface is solidified associated with cooling by heat radiation from the metal member and the resin member and heat transfer to peripheral device parts, thereby joining together both members.

(i) Press mark present on the surface of the metal member

Figure 3:
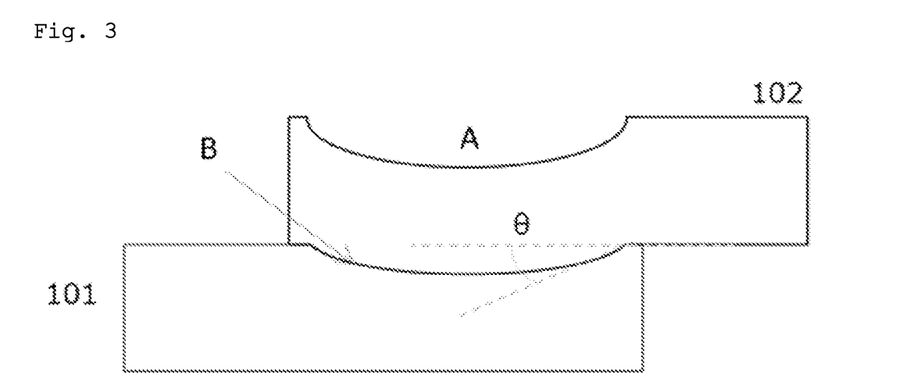
FIG. 3 is a drawing showing an example of a sectional view of a joining site of a metal-resin composite produced by friction stir welding (FSW).
Figure 4:
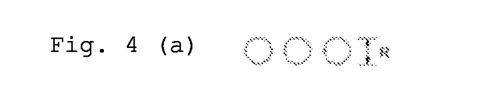

FIG. 3 shows an example of a sectional view of the joining part of the metal-resin composite produced by FSW. As shown in FIG. 3, in the friction stirring step of FSW, a press mark A is formed in a concave shape by pressing the rotating tool 201 on the surface of the metal member 102 on its side opposite to the resin member 101. FIGS. 4 (a)-(e) show examples shows an example of a front view of the press mark formed on the surface of the metal member of the metal-resin composite produced by FSW. As shown in FIGS. 4 (a)-(e), the press mark may have FIGS. 4 (a) one or two or more individual circular shapes or FIG. 4 (b) a straight line as an overall shape formed by overlapping two or more circular press marks. Also, the press mark may have FIG. 4 (c) an overall shelf-like shape, FIG. 4 (d) lattice-like or network shape, or FIG. 4 (e) zigzag shape, which is formed by overlapping two or more circular press marks.

The diameter (R) of a circular press mark cannot be unconditionally limited because it has various forms according to the thermoplastic resin and other compounding components constituting the resin member or the method and degree of surface roughening of the metal member. However, the diameter (R) is within a range of preferably 1 [mm] or more, more preferably 2 [mm] or more, still more preferably 3 [mm] or more to preferably 50 [mm] or less, more preferably 40 [mm] or less, and still more preferably 30 [mm] or less. Also, the ratio of the press mark area to the area of contact between the surface-roughened metal member and the resin member cannot be unconditionally limited because it has various forms according to the thermoplastic resin and other compounding components constituting the resin member or the method and degree of surface roughening of the metal member. The ratio is within a range of preferably 1 [%] or more, more preferably 10 [%], and still more preferably 20 [%] to preferably 100 [%] or less, more preferably 90 [%] or less, and still more preferably 80 [%] or less.

(ii) Projection Mark of the Metal Member to the Resin Member Side

The projection mark of the metal member to the resin member side depends on the thickness and material of the metal member and the push-in degree of the rotating tool, but has a circular-arc shape in a sectional view as shown in FIG. 3 (B in FIG. 3). When the degree of projection of the metal member 102 to the resin member 101 side is represented by the angle (θ) with respect to the metal member 102, the angle is within a range (θ) of preferably 20 [°] or less, more preferably 15 [°] or less, and still more preferably 10 [°] or less.

(Application of Metal-Resin Composite)

Applicable examples of main applications of the metal-resin composite according to the present invention include electric-electronic components such as casings of electronic devices of various domestic electric appliances, a cellular phone, PC (Personal Computer), and the like, a protecting/supporting member-plural individual semiconductors or modules for a box-shape electric-electronic component integrated module, a sensor, a LED lamp, a connector, a socket, a resistor, a relay case, a switch, a coil bobbin, a capacitor, a variable condenser case, an optical pick-up, an oscillator, various terminal plates, a transformer, a plug, a printed substrate, a tuner, a speaker, a microphone, a headphone, a small-size motor, a magnetic head base, a power module, a terminal block, a semiconductor, a liquid crystal, a FDD carriage, a FDD chassis, a motor brush holder, a parabolic antenna, a computer-related component, and the like; house/office electric appliance components such as a VTR component, a television component, an iron, a hair dryer, a rice cooker components, a microwave oven component, an audio component, components of sound/video device components such as audio/laser disc/compact disc/DVD disk/blue-ray disc and the like, an illumination component, a refrigerator component, an air conditioner component, a type writer component, a word processor component, and a water-section device components such as a water heater, a bath hot-water amount/temperature sensor, and the like; machine-related components such as an office computer-related component, a telephone-related component, a facsimile-related component, a copying machine-related component, a washing jig, a motor component, a lighter, a typewriter, and the like: optical device/precision machine-related components such as a microscope, a binoculars, a camera, a watch, and the like; automobile/vehicle-related components such as an alternator terminal, an alternator connector, a brush holder, a slip ring, an IC regulator, a potentiometer base for a light dimmer, a relay block, an inhibitor switch, various valves such as an exhaust gas valve, various fuel-related/exhaust system/intake system pipes, an air intake nozzle snorkel, an intake manifold, a fuel pump, an engine cooling water joint, a calibrator main body, a calibrator spacer, an exhaust gas sensor, a cooling water sensor, an oil temperature sensor, a brake pad wear sensor, a throttle position sensor, a crank shaft position sensor, an air flow meter, a brake pad wear sensor, a thermostat base for an air conditioner, a heating hot-air flow control valve, a brush holder for a radiator motor, a water pump impeller, a turbine vane, a wiper motor-related component, a distributer, a starter switch, an ignition coil and a bobbin thereof, a motor insulator, a motor rotor, a motor core, a starter relay, a wire harness for transmission, a wind washer nozzle, an air conditioner panel switch substrate, a coil for a fuel-related electromagnetic valve, a connector for a fuse, a phone terminal, an electrical component insulating plate, a step motor rotor, a lump socket, a lamp reflector, a lamp housing, a brake piston, a solenoid bobbin, an engine oil filter, an ignition system case, a power module, an inverter, a power device, an intelligent power module, an insulating gate bipolar transistor, a power control unit, a reactor, a converter, a capacitor, an insulator, a motor terminal block, a battery, an electric compressor, a battery current sensor, a junction block, a case for housing an ignition coil for a DLI system, and the like; and other various applications.

EXAMPLES

The present invention is described in further detail by giving examples below. In addition, "parts" and "%" are on a mass basis unless otherwise specified.

Measurement Example 1 (Measurement of Developed Area Ratio (Sdr) of Roughened Surface Formed in Metal Member)

The surface roughness of the roughened surface of a metal member was evaluated by a method using a confocal microscope OPTELICS HYBRID manufactured by Lasertec Corporation) according to ISO 25178. A confocal mode using a white light source was used. Selected was an objective lens having a magnification in which the one side length of a view range was 3 to 8 times the average length (RSm) of roughness curve elements obtained in Measurement Example 2. A three-dimensional height original surface image of a metal roughened surface was obtained in a peak search mode with a height-direction scan resolution of 10 nm. The original surface image was subjected to surface tilt correction and then surface-filtered with an S filter of 2.5 μm and an L filter of 0.8 μm (both Gaussian filters), and further a median filter for noise cutting (filter size of 3×3) was applied one time to form an image the entire of which was used as an evaluation region. Then, the developed area ratio (Sdr) of the roughened surface of the metal member was determined. The measurement points included five points: the center and four corners of the roughened surface 103 shown in FIG. 2, and an average of the values at the five points was used as a Sdr value.

Measurement Example 2 (Measurement of Line Roughness of Metal Surface (Rz, RSm))

The surface roughness of the roughened surface of a metal member was evaluated by using a stylus-type surface roughness meter (Surfcom 1400D manufactured by Tokyo Seimitsu Co., Ltd.) according to JIS-B 0601-2001 (ISO 4287). A roughness curve was obtained by using a spherical indenter (tip radius: 2 μm), an evaluation length of 4 mm, a scan speed of 0.06 mm/s, a reference length of 0.8 mm, a low-pass cutoff length of 2.5 μm, and a Gaussian function as a cutoff filter. The maximum height (Rz) of the roughness curve and the average length (RSm) of roughness curve elements were obtained from the resultant roughness curve. The measurement positions included two arbitrary straight-line portions in a parallel relation therebetween in the roughened surface of the metal member and two arbitrary straight-line portions in a vertical relation thereto, and an average value of the values of the parameters at a total of four straight lines was used.

Measurement Example 3 (Measurement of Joining Strength of Metal-Resin Composite)

Shear tensile measurement was performed for a metal-resin composite (Type-B model according to ISO 19095) using a material tester (Shimadzu Corporation, AG-IS) at a tensile speed of 5 mm/min. The average value (n=5) of maximum stress values until the metal-resin composite reached fracture was determined at room temperature as a measurement temperature. Next, after the shear tensile measurement, a fracture surface of the metal member fractured was observed with an optical microscope to estimate the joining area (denoted by 104 in FIG. 2) with the resin member. The joining strength (MPa) was calculated as a value obtained by dividing the average value of maximum stress value measured until fracture was reached as described above by the joining area ((average value of maximum stress values until fracture was reached)/(joining area)).

Measurement Example 4 (Heat Cycle Test (Heat Cycle Resistance) of Metal-Resin Composite)

A metal-resin composite (Type-B model according to ISO 19095) was introduced in a hot-cold shock testing apparatus (Espec Corporation, "TSA-103EL"), and a heat cycle of −40° C./30 minutes→160° C./30 minutes was performed in 100 cycles (1 hour per cycle). After the heat cycle test, the metal-resin composite was subjected to "shear tensile test" according to Measurement Example 3 to determine the joining strength after the heat cycle test.

The joining strength before the heat cycle test was regarded as the "initial joining strength", and "(joining strength after the heat cycle test)/(joining strength before the heat cycle test)×100" was regarded as a retention rate (%). It means that the higher the retention rate is, the more excellent the heat cycle resistance is.

Measurement Example 5 (Melt Viscosity of Resin Member)

Measurement was performed by using a capillary rheometer (Capilograph 1D manufactured by Toyo Seiki Co., Ltd.) according to JIS K7199 or ISO 11443 under the condition of the resin temperature separately measured during joining and the condition of ratio (L/D)=40 of the orifice length (L) to orifice diameter (D) at a shear rate of 10/s. The resin temperature during joining was measured separately from actual joining. In this case, the same metal member and the same resin member were used, and the maximum temperature was measured when a thermocouple-type temperature sensor with a thickness of 50 microns was held on the surface 103 in FIG. 1 and the tool was push and stirred under the same conditions.

Measurement Example 6 (Melting Point and Recrystallization Temperature of Resin Member)

A differential scanning calorimeter ("PYRIS Diamond DSC" manufactured by Perkin Elmer, Inc.) was used, and based on an analytical method (DSC method; according to JIS K-7121) by the differential scanning calorimeter, a temperature showing the maximum endothermic peak was measured as the melting point (Tm) by heating from room temperature to 350° C. at 20° C./min, and a temperature showing the maximum exothermic peak was measured as the recrystallization temperature (Tc2) by lowing the temperature from a melt state at 20° C./min.

Production Example (Production of PPS Resin)
[Step 1]
In a 150-liter autoclave provided with a pressure gauge, a thermometer, a condenser, a decanter, a stirring blade with a rectifying column connected thereto, 33.075 parts by mass (225 parts by mole) of p-dichlorobenzene (abbreviated as "p-DCB" hereinafter), 3.420 parts by mass (34.5 parts by mole) of NMP, 27.300 parts by mass (230 parts by mole as NaSH) of a 47.23 mass % aqueous NaSH solution, and 18.533 parts by mass (228 parts by mole as NaOH) of a 49.21 mass % aqueous NaOH solution were charged, and then heated to 173° C. over 5 hours under stirring in a nitrogen atmosphere, distilling off 27.300 parts by mass of water. Then, the autoclave was closed, and p-DCB distilled off by azeotrope during dehydration was separated by the decanter and appropriately returned to the autoclave. In the autoclave after the completion of dehydration, a fine-particle anhydrous sodium sulfide composition was in a state of being dispersed in p-DCB. The content of NMP in the composition was 0.079 parts by mass (0.8 parts by mole) and thus it was shown that 98% by mole (33.7 parts by mole) of NMP charged was hydrolyzed to a sodium salt (abbreviated as "SMAB" hereinafter) of NMP ring-opening compound (4-(methylamino)butyric acid). The SMAB amount in the autoclave was 0.147 parts by mole per mole of sulfur atoms present in the autoclave. When the total amount of NaSH and NaOH added was converted to anhydrous Na2S, the theoretical amount of dehydration was 27.921 parts by mass, and thus it was shown that 0.609 parts by mass (33.8 parts by mole) in the amount of 0.878 parts by mass (48.8 parts by mole) of water remaining in the autoclave was consumed by hydrolysis reaction of NMP and NaOH and is not present as water in the autoclave, and 0.269 parts by mass (14.9 parts by mole) of the residue remains in the form of water or crystal water in the autoclave. The amount of water in the autoclave was 0.065 moles per mole of sulfur atoms present in the autoclave.

[Step 2]

After the completion of the dehydration step, the internal temperature was decreased to 160° C. by cooling, and 46.343 parts by mass (467.5 parts by mole) of NMP was charged and then heated to 185° C. The amount of water in the autoclave was 0.025 moles per mole of NMP charged in step 2. When the gauge pressure reached 0.00 MPa, the valve connected to the rectifying column was opened, and the internal temperature was increased to 200° C. over 1 hour. In this case, the temperature of the rectifying column outlet was controlled to 110° C. or less by cooling and valve opening. The mixed vapor of distilled-off p-DCB and water was condensed by the condenser and separated by the decanter, and then p-DCB was returned to the autoclave. The amount of water distilled off was 0.228 parts by mass (12.7 parts by mole).

[Step 3]

At the start of step 3, the amount of water in the autoclave was 0.041 parts by mass (2.3 parts by mole) corresponding to 0.005 moles per mole of NMP charged in step 2 and 0.010 moles per mole of sulfur atoms present in the autoclave. The amount of SMAB present in the autoclave was the same as in Step 1, that is, 0.147 moles per mole of sulfur atoms present in the autoclave. Next, the internal temperature was increased from 200° C. to 230° C. over 3 hours, and then increased to 250° C. after stirring at 230° C. for 1 hour, followed by further stirring for 1 hour. The gauge pressure at the internal temperature of 200° C. was 0.03 MPa, and the final gauge pressure was 0.40 MPa. After cooling, 0.650 parts by mass of the resultant slurry was poured into 3 parts by mass (3 parts by liter) of water, stirred at 80° C. for 1 hour, and then filtered. The resultant cake was again stirred in 3 parts by mass (3 parts by liter) of hot water for 1 hour, washed, and then filtered. This operation was repeated four times. Then, pH was adjusted to 4.0 by again adding 3 parts by mass (3 parts by liter) of hot water and acetic acid to the resultant cake, followed by stirring for 1 hour, washing, and filtration. The resultant cake was again stirred in 3 parts by mass (3 parts by liter) of hot water for 1 hour, washed, and then filtered. This operation was repeated two times. The resultant cake was dried overnight at 120° C. by using a hot-air dryer, producing a white powdery PPS resin (1).

(Production of Resin Composition for Producing Resin Member)

The PPS resin produced as described above was mixed with glass fibers (average fiber length: 200 μm, average diameter: 10 μm) at a mixing ratio (all "parts by mass") shown in Table 1, and the materials were uniformly mixed by a tumbler. Then, the mixed materials were charged in a vented twin-screw extruder (TEX-2 manufactured by Japan Steel Works, Ltd.) and melt-kneaded with a resin component discharge amount of 30 kg/hr, a screw rotational speed of 220 rpm, and a set resin temperature set to 320° C., producing pellets of a resin composition for each of Examples 1 to 6 and Comparative Examples 1 to 5. The resultant resin composition had a melt viscosity of 2540 Pa·s (under the condition of 300° C. and 10/s), a non-Newtonian index of 1.10, a melting point (Tm) of 279° C., and a recrystallization temperature (Tc2) of 233° C. While in Example 7 and Comparative Example 6, only a PC resin (product name "Iupilon E-2000" manufactured by Mitsubishi Engineering-Plastics Corporation) was used in place of the PPS resin. The melt viscosity was 1291 Pa·s (under the condition of 290° C. and 10/s), and the non-Newtonian index was 1.12, but the melting point (Tm) and the recrystallization temperature were not detected.

(Production of Resin Member)

A non-roughened metal was placed in an injection molding machine (SV-50M manufactured by Sumitomo Heavy Industries, Ltd.), and the pellets of the resin composition for each of Examples 1 to 7 and Comparative Examples 1 to 5 were injection-molded at a screw temperature of 320° C., producing a resin member having a size of length×width×thickness=45 mm×10 mm×3.0 mm. Comparative Example 6 is described later.

(Production of Metal Member)

(Production of Metal Member (B-0))

A metal member (B-0) was cut into a size of length×width×thickness=45 mm×10 mm×1.5 mm from an untreated (non-roughened) plate of each of aluminum die cast (ADC12), aluminum (A5052), and copper (C1100). The maximum height roughness (Rz) of a roughness curve and the average length (RSm) of roughness curve elements of the metal member were evaluated according to Measurement Example 2. Also, the developed area ratio (Sdr0) at the interface of the metal member was evaluated according to Measurement Example 1.

(Production of Metal Member (Surface Roughening B-1))

A first surface roughening step was performed by immersing the metal member (B-0) of ADC12 in a 5% aqueous sodium hydroxide solution at 50° C. for 20 seconds. Next, in a second surface roughening step, a metal member (surface roughening B-1) having a roughened surface was obtained by immersion for 20 seconds in an erosive aqueous solution prepared by mixing 67.5% nitric acid and 55% hydrofluoric acid at a volume ratio of 9:1. The resultant metal member was evaluated with respect to the maximum height roughness (Rz) of a roughness curve and the average length (RSm) of roughness curve elements according to Measurement Example 2. Also, the developed area ratio (Sdr1) of the roughened surface of the metal member was evaluated according to Measurement Example 1. Further, the ratio (Sdr1/Sdr0) to the developed area ratio (Sdr0) at the interface of the metal member (B-0) with the non-roughened surface was calculated from Sdr of the roughened metal member. The results are shown in Table 1. The same applies below.

(Production of Metal Member (Surface Roughening B-2))

Only the first surface roughening step was performed by immersing the metal member (B-0) of ADC12 in a 5% aqueous sodium hydroxide solution at 50° C. for 20 seconds, producing a metal member (surface roughening (B-2).

(Production of Metal Member (Surface Roughening B-3))

The first surface roughening step was performed by immersing the metal member (B-0) of ADC12 in a 5% aqueous sodium hydroxide solution of 50° C. for 10 seconds. Next, in the second surface roughening step, a metal member (surface roughening B-3) was obtained by immersion for 10 seconds in an erosive aqueous solution prepared by mixing 67.5% nitric acid and 55% hydrofluoric acid at a volume ratio of 9:1.

(Production of Metal Member (Surface Roughening B-4))

The metal member (B-0) of ADC12 was treated with Amalpha of Mec Company, Ltd. (D process), producing a metal member (surface roughening B-4).

(Production of Metal Member (Surface Roughening B-5))

The metal member (B-0) of A5052 was treated with Amalpha of Mec Company, Ltd. (D process), producing a metal member (surface roughening B-5).

(Production of Metal Member (Surface Roughening B-6))

The metal member (B-0) of C1110 was treated with Amalpha of Mec Company, Ltd. (A10201 process), producing a metal member (surface roughening B-6).

(Production of Metal Member (Surface Roughening B-7))

The first surface roughening step was performed by immersing the metal member (B-0) of ADC12 in a 2% aqueous sodium hydroxide solution of 50° C. for 20 seconds. Next, in the second surface roughening step, a metal member (surface roughening B-7) was obtained by immersion for 20 seconds in an erosive aqueous solution prepared by mixing 15% nitric acid and 10% hydrofluoric acid at a volume ratio of 9:1.

(Production of Metal Member (Surface Roughening B-8))

The metal member (B-0) of ADC12 was subjected to dry shot blasting for 60 seconds with a steel grid abrasive, producing a metal member (surface roughening B-8).

(Production of Metal-Resin Composite)

Examples 1 to 7 and Comparative Examples 1 to 5

As shown in FIG. 1, each of the resin members 101 was superposed on each of the metal members 102 (in Comparative Examples 1 to 3, each of the metal members 102 without the roughened surface) having the roughened surface formed in at least one surface thereof so as to be in contact with the roughened surface (contact area of length× width=10 mm×10 mm). Next, a stationary-type friction spot joining apparatus (FSJ manufactured by Kawasaki Heavy Industries, Ltd.) was used, and the resin member 101 and the metal member 102 were fixed on an exclusive jig so as to be on the lower side and the upper side, respectively, as shown in FIG. 1. Then, the resin member 101 and the metal member 102 were joined together by pressing the rotating tool 201 (ϕ6 mm) rotated on the surface of the metal member 102. In this case, with the rotational speed of the rotating tool set to 3000 rpm, the push-in speed set to 5 mm/s, and the push-in pressure set to 800 N, the rotating tool 201 was maintained for 1 to 2 seconds in the state of being pushed in the surface of the metal member 102. Then, the rotating tool was rotated at a rotational speed decreased to 100 rpm in a pressed state and maintained for 3.5 seconds. As a result of pressing of the rotating tool under rotation, a circular press mark of about ϕ5 mm was found on the surface of the metal member 102 after joining, while a distorted mark was not found on the joining surface between the resin member 101 and the metal member 102 and on the resin member 101. The joining strength and heat cycle resistance of the metal-resin composite produced in each of Examples 1 to 7 and Comparative Examples 1 to 5 were evaluated by the methods described in Measurement Example 3 and Measurement Example 4, respectively. The results are shown in Table 1.

Comparative Example 6

The metal member B-2 was pre-heated to 200° C. on a hot plate and then set in a mold (mold temperature: 140° C.) of an injection molding machine (SV-50M manufactured by Sumitomo Heavy Industries, Ltd.). Then, the pellets of the resin composition for Comparative Example 6 were insert-molded at a screw temperature of 290° C. so that the roughened surface (10 mm×10 mm) of the metal member was joined to the resin member, producing a metal-resin composite. The joining strength and heat cycle resistance of the metal-resin composite produced in Comparative Example 6 were evaluated by the methods described in Measurement Example 3 and Measurement Example 4, respectively. The results are shown in Table 1.

TABLE 1

| | | Example 1 | Example 2 | Example 3 | Example 4 | Example 5 | Example 6 | Example 7 | Comparative Example 1 |
|---|---|---|---|---|---|---|---|---|---|
| Resin member (Resin composition) | PPS resin | 60 | 60 | 60 | 60 | 60 | 60 | — | 60 |
| | PC resin | — | — | — | — | — | — | 100 | — |
| | Glass fiber | 40 | 40 | 40 | 40 | 40 | 40 | — | 40 |
| | Melt viscosity (Pa·s) | 2540 | 2540 | 2540 | 2540 | 2540 | 2540 | 1291 | 2540 |
| Metal member | Metal type | ADC12 | ADC12 | ADC12 | ADC12 | A5052 | C1100 | ADC12 | ADC12 |
| | Surface roughening | B-1 | B-2 | B-3 | B-4 | B-5 | B-6 | B-2 | B-0 |
| | Sdr(%) | 42 | 5 | 18 | 34 | 30 | 23 | 5 | 1 |
| | Sdr1/Sdr0 | 47 | 7 | 26 | 49 | 8 | 32 | 7 | 1 |
| | Rz(μm) | 3 | 2 | 4 | 7 | 22 | 5 | 2 | 2 |
| | RSm(μm) | 44 | 56 | 60 | 54 | 140 | 36 | 56 | 107 |
| Physical properties of metal-resin composition | Joining strength (MPa) | 34 | 20 | 23 | 31 | 27 | 29 | 11 | No joining |
| | (Heat cycle resistance) | | | | | | | | |
| | Joining strength after heat cycle test (MPa) | 31 | 18 | 21 | 28 | 22 | 25 | 9 | — |
| | Retention rate (%) | 92% | 90% | 90% | 92% | 80% | 88% | 80% | — |

TABLE 1-continued

|  |  | Comparative Example 2 | Comparative Example 3 | Comparative Example 4 | Comparative Example 5 | Comparative Example 6 |
|---|---|---|---|---|---|---|
| Resin member (Resin composition) | PPS resin | 60 | 60 | 60 | 60 | — |
|  | PC resin | — | — | — | — | 100 |
|  | Glass fiber | 40 | 40 | 40 | 40 | — |
|  | Melt viscosity (Pa·s) | 2540 | 2540 | 2540 | 2540 | 1291 |
| Metal member | Metal type | A5052 | C1100 | ADC12 | ADC12 | ADC12 |
|  | Surface roughening | B-0 | B-0 | B-7 | B-8 | B-2 |
|  | Sdr(%) | 4 | 1 | 3 | 4 | 5 |
|  | Sdr1/Sdr0 | 1 | 1 | 4 | 6 | 7 |
|  | Rz(μm) | 2 | 0.4 | 2 | 7 | 2 |
|  | RSm(μm) | 101 | 66 | 76 | 126 | 56 |
| Physical properties of metal-resin composition | Joining strength (MPa) | No joining | No joining | 5 | 2 | No joining |
|  |  |  | (Heat cycle resistance) |  |  |  |
|  | Joining strength after heat cycle test (MPa) | — | — | 2 | 0 | — |
|  | Retention rate (%) | — | — | 30% | 0% | — |

The results in Table 1 indicate that in Examples 1 to 6 using the PPS resin as the thermoplastic resin constituting the resin member, the joining strength between the resin member and the metal member is significantly improved. Also, in Example 7 using the PC resin as the thermoplastic resin constituting the resin member, joining can be made by a combination making joining impossible by the injection molding step of Comparative Example 6. This result indicates that when the developed area ratio (Sdr) of the roughened surface is designed to be high, the joining strength between the resin member and the metal member is improved.

In addition, a section of the joining surface between the resin member and the metal member, obtained by cutting the metal-resin composite produced in each of Examples 1 to 7, was observed with a scanning electron microscope (SEM, S-2380N model manufactured by Hitachi, Ltd.). As a result, the metal member was pushed into the resin member to be distorted by about several tens μm. In any case, the angle θ of the projection mark on the metal member to the resin member side was 6° to 10°. In addition, at the joining surface between the resin member and the metal member, the resin member was deeply securely penetrated into the roughened surface of the metal member having a surface area increased by surface roughening, and thus the roughened surface of the metal member was filled with the resin member without gaps. It can also be understood from the results of observation that in the metal-resin composite produced in each of Examples 1 to 7, the joining strength between the resin member and the metal member is significantly improved.

The invention claimed is:

1. A method for producing a metal-resin composite containing a metal member, which has a roughened surface in at least a portion of the surface thereof, and a resin member, the resin member being joined so as to be in contact with at least a portion of the roughened surface, the method comprising:
   a step of joining the resin member and the metal member by melting the resin member with the frictional heat generated in the surface of the metal member on its side opposite to the resin member in a state where the metal member and the resin member are superposed,
   wherein when the roughened surface is measured at arbitrary five points by using a confocal microscope according to ISO 25178, the developed area ratio (Sdr) is 5 or more in terms of number-average value;
   wherein when the roughened surface is measured at arbitrary four straight-line portions by using the stylus-type roughness meter according to ISO 4287, average length (RSm) of roughness curve elements is 36 to 60 μm.

2. The method for producing a metal-resin composite according to claim 1, wherein the frictional heat is generated by pressing a rotating tool on the surface of the metal member on its side opposite to the resin member.

3. The method for producing a metal-resin composite according to claim 1, wherein the melt viscosity of the resin member is 200 to 6000 Pa·s.

4. The method for producing a metal-resin composite according to claim 1, wherein the resin member contains a polyarylene sulfide resin.

5. A metal-resin composite comprising a metal member and a resin member which are joined together,
   wherein the resin member contains at least a thermoplastic resin;
   the metal member has a roughened surface in at least a portion of the surface thereof, and when the roughened surface is measured at arbitrary five points by using a confocal microscope according to ISO 25178, the developed area ratio (Sdr) is 5 or more in terms of number-average value;
   when the roughened surface is measured at arbitrary four straight-line portions by using the stylus-type roughness meter according to ISO 4287, average length (RSm) of roughness curve elements is 36 to 60 μm;
   the resin member and the metal member are joined together by melting the resin member with the frictional heat generated in the surface of the metal member on its side opposite to the resin member in the state the resin member is superposed so as to be in contact with at least a portion of the roughened surface; and the melting point of the thermoplastic resin is 260° C. or more.

6. The metal-resin composite according to claim 5, wherein the resin member has a melt viscosity in the range of 200 Pas to 6000 Pa·s.

7. The metal-resin composite according to claim 5, wherein the metal member is a member selected from the group consisting of an aluminum alloy, a magnesium alloy, a copper alloy, and a titanium alloy, aluminum die cast, aluminum and copper.

8. A metal-resin composite comprising a metal member and a resin member which are joined together,
- wherein the resin member contains at least a thermoplastic resin;
- the metal member has a roughened surface in at least a portion of the surface thereof, and when the roughened surface is measured at arbitrary five points by using a confocal microscope according to ISO 25178, the developed area ratio (Sdr) is 5 or more in terms of number-average value;
- when the roughened surface is measured at arbitrary four straight-line portions by using the stylus-type roughness meter according to ISO 4287, average length (RSm) of roughness curve elements is 36 to 60 μm;
- the resin member is joined so as to be in contact with at least a portion of the roughened surface;
- the surface of the metal member has a press mark on its side opposite to the resin member; and
- the melting point of the thermoplastic resin is 260° C. or more.

9. The metal-resin composite according to claim 8, wherein the press mark present in the surface of the metal member has a concave shape in a sectional view and a shape having independent one or two or more circles in a front view.

10. The metal-resin composite according to claim 8, wherein the press mark present on the surface of the metal member has a concave shape in a sectional view and a shape in a front view which independent one or two or more circular press marks overlap to form an overall straight-line shape, an overall shelf-like shape, an overall lattice-like or network shape, or an overall zigzag shape.

11. The metal-resin composite according to claim 8, wherein the resin member has a melt viscosity in the range of 200 Pa·s to 6000 Pa·s.

12. The metal-resin composite according to claim 8, wherein the metal member is a member selected from the group consisting of an aluminum alloy, a magnesium alloy, a copper alloy, and a titanium alloy, aluminum die cast, aluminum and copper.

* * * * *